United States Patent
Chong et al.

(10) Patent No.: US 9,277,280 B2
(45) Date of Patent: *Mar. 1, 2016

(54) METHOD FOR CONTROLLING DIGITAL FILM PLAY-COUNT AND A SYSTEM THEREOF

(71) Applicant: GDC Technology (Shenzhen) Limited, Shenzhen (CN)

(72) Inventors: Man Nang Chong, Hong Kong (CN); Pranay Kumar, Hong Kong (CN); Sam Chiu, Hong Kong (CN); Jin Song Li, Hong Kong (CN)

(73) Assignee: GDC Technology (Shenzhen) Limited, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,535

(22) Filed: Feb. 6, 2015

(65) Prior Publication Data

US 2015/0156549 A1   Jun. 4, 2015

Related U.S. Application Data

(63) Continuation of application No. 14/207,226, filed on Mar. 12, 2014, now Pat. No. 8,990,846.

(30) Foreign Application Priority Data

Sep. 5, 2013   (CN) .......................... 2013 1 0399252

(51) Int. Cl.
| | | |
|---|---|---|
| *H04N 21/2347* | (2011.01) | |
| *H04N 21/254* | (2011.01) | |
| *H04N 21/266* | (2011.01) | |
| *H04N 21/442* | (2011.01) | |
| *H04N 21/6334* | (2011.01) | |
| *H04N 21/4623* | (2011.01) | |
| *H04N 21/235* | (2011.01) | |
| *H04N 21/4405* | (2011.01) | |

(52) U.S. Cl.
CPC ....... *H04N 21/4623* (2013.01); *H04N 21/2347* (2013.01); *H04N 21/2351* (2013.01); *H04N 21/4405* (2013.01)

(58) Field of Classification Search
None
See application file for complete search history.

(56) References Cited

U.S. PATENT DOCUMENTS

| | | | | |
|---|---|---|---|---|
| 2006/0020825 A1* | 1/2006 | Grab | ....................... | G06F 21/10 713/193 |
| 2006/0080742 A1* | 4/2006 | Nakayama | .............. | G06F 21/10 726/27 |
| 2007/0171374 A1* | 7/2007 | Moore | ................... | G03B 21/32 352/40 |
| 2009/0144542 A1* | 6/2009 | Wetmore | .......... | G06F 17/30056 713/156 |
| 2010/0246826 A1* | 9/2010 | Ogura | .................... | H04N 5/765 380/277 |
| 2010/0247070 A1* | 9/2010 | Ogura | .................... | G06Q 10/06 386/326 |

* cited by examiner

*Primary Examiner* — Brian T Pendleton
*Assistant Examiner* — Jean D Saint Cyr
(74) *Attorney, Agent, or Firm* — Morrison & Foerster LLP

(57) ABSTRACT

The invention discloses a method for controlling digital film play-count and a system thereof, wherein a play-count parameter is added into a KDM file where a key delivery message used for controlling film play is embedded, detecting the play-count parameter for a playing film, setting RSA key abstracts of an FDM packager of all authorized contracting film producers, safely importing the KDM and play-count into a security module, detecting the play-count parameter for a playing film. The film is not permitted to play unless existing play-count is less than the authorized play-count in the FDM. The invention fulfills the requirements and demands for controlling the distribution and playback of digital films in the second-tier market using technologies such as the authorized play-count and a method to charge on the basis of play-count.

3 Claims, 4 Drawing Sheets

METHOD FOR CONTROLLING DIGITAL FILM PLAY-COUNT AND A SYSTEM THEREOF

FIELD OF THE INVENTION

The present invention relates to the field of digital film playing, in particular to a method for controlling digital film play-count and a system thereof.

BACKGROUND

At present, in the existing digital film projector, a display screen is typically set up to display the relevant information from the projector, for example, the films to be played, the playing operations and relevant parameters in the film playing process etc. The display screen is usually connected by a control circuit to a storage unit in the projector, and it is usually operated by an operator.

With the popularization of digital film entertainment, the second-tier market and its additional requirements for digital film playback have emerged. For example, private cinema viewers are eager to adopt professional digital film players so as to enjoy first-run theatrical film releases at the comfort of their own homes; further, there are some personalized demands in the film market, such as ordering and watching of a particular post theatrical film when desired. These services are usually provided in a movie premiere, a party, or as part of some commercial activity. In addition, the demands for watching first-run and post-theatrical film releases call for a system that is capable of charging on a play-count. However, existing digital film projection systems cannot meet the requirements and demands of this second-tier market due to their inherent limitations of obtaining authorization from digital film playback.

Some of the reasons are as follows.

For copyright protection, existing cinema projection systems usually adopt a KDM (Key Delivery Message) licensing method, which means that a cinema needs to apply for a KDM from a film distributor. The KDM is a file for delivering a key; it mainly contains the following three kinds of information: a content decryption key, a key parameter and a TDL (Trusted Device List). The key parameter is mainly the key's time window (valid time period), i.e., the scheduled time for playing a film. The TDL is an information list of the valid and authorized equipment to play the film.

The encrypted film content and its key are generated after a digital film is compressed, encrypted and packaged. The encrypted film content and its relevant information form a Digital Cinema Package (DCP), and are transmitted to an exhibitor or a cinema; the key, upon being further encrypted, will be digitally signed along with other relevant information to form a KDM, and is then transmitted to authorized cinemas by a film distributor or its entrusted film producer. Upon receiving the KDM, the cinema can decrypt and play the encrypted digital film only by correctly extracting the film content and obtaining the key after decryption. In addition to the key, the KDM also includes the valid time period and a TDL for the key etc. Therefore, by virtue of such information, the film distributor can control both the film playing schedule and the projector. In other words, a film cannot be played if the time period carried by the KDM is exceeded, or if it is in a projector not in connection with the server designated by the KDM.

The key's time window is determined upon communications among the film distributor, the cinema and the film producer. After the key has expired, the cinema can apply for an extension if necessary. After the application for extension is approved, the key must be reproduced, and the film distributor (e.g. The China Film Group in mainland China) issues a "Notice of Extension" on its official website and indicates the expiration date of the extended key.

The aforementioned KDM distribution method is defined as part of the Digital Cinema Initiative (DCI) standard, and the KDM format cannot be altered arbitrarily. At present, digital film projection technology can be broadly categorized on the basis of resolution ratio, namely into 4K, 2K, 1.3K and 0.8K. 4K (resolution ratio of 4096×2016 8.25 megapixel) projection is currently the state-of-the-art for commercial digital projection, and it is not commonly adopted even in major cinema networks in first-tier cities. 2K (resolution ratio of 2048×1080 2.21 megapixel) is currently the international standard for film projection. 2K is effectively the same as 4K in terms of synchronized film playing, as the difference of the visual effects between 2K and 4K can only be seen on a display screen of more than 20 m in width. 1.3K (a resolution ratio of 1280×1024 1.31 megapixel) is the current Chinese National standard, whereas 0.8K (resolution ratio of 1024× 768 0.786 megapixel) is a film projection standard used mainly in rural China. Overall, there is a wide adoption of various projection standards across China.

Due to copyright restrictions, digital films, when exhibited in cinemas, have to be played on specialized hardware, such as a dedicated chip in the server of a digital film projector, using a specialized process such as the abovementioned KDM method for playing digital films to manage the playable time, the authorized server information, and the key used for decrypting a film for playing. However, at present, the KDM can only control the playable time period, which is appropriate for commercial cinemas due to their fixed daily schedule for playback of digital films. However, this is unsuitable for the purposes of secondary markets such as private cinemas. In addition, post-theatrical release films (in abovementioned DCP formats) cannot be played on-demand. Unlike a film in its theatrical release, the requirements for playing a film after theatrical release are not as high. Accordingly, subsequent distribution is difficult, and on-demand requirements are not met. Based on the prior art, digital films cannot be played under the control of play-count in the second-tier market in private cinemas during and after theatrical release.

Therefore, the prior art needs to be improved and developed.

BRIEF SUMMARY OF THE DISCLOSURE

In consideration of disadvantages of the prior art, embodiments of the present invention aims to provide a method for controlling digital film play-count and a system thereof, and providing a method and system for licensing to play digital films that is capable of charging payments based on play-count. The technical solutions of the present invention are shown as below:

A method for controlling digital film play-count, wherein it comprises the following steps:

A, in a process of generating a license file for playing a digital film, a play count parameter is added into a KDM file where a key delivery message used for controlling film play is embedded, for generating a film delivery message file also known as the FDM file;

B, setting key abstracts of the RSA public key in a FDM packager of all authorized contracting film producers in a player, adding a key abstract of the FDM packager of an authorized contracting film producer into the FDM file and importing it into a security module of the player;

C, detecting the play count parameter of a playing film, detecting and judging a valid play count on the basis of different film footages or frame length percentage so as to confirm a valid play of the current film, and using a TLS (Transport Layer Security Protocol) encryption message for informing the security module of the valid play of the film; and D, judging whether the current play count is greater than the play count parameter in the KDM file; the film is permitted to play if not, and prohibited if so.

The method for controlling digital film play count, wherein the step A specifically includes:

In the process of generating a license file for playing a film, a TAG for extending an original KDM is used for packaging an original KDM file where a key delivery message used for controlling film play is embedded together with a parameter of an authorized play count, to generate a film delivery message file known as an FDM file.

The method for controlling digital film play-count, wherein the step B specifically includes:

B1, key abstracts of the RSA public key in a FDM packager of all authorized contracting film producers are pre-stored in a player, and stored in a key abstract list;

B2, adding a key abstract of the FDM packager of an authorized contracting film producer into the FDM file, and verifying whether the key abstract in the FDM file is identical to one of the pre-stored key abstracts, if yes, the KDM file and play-count parameter are permitted to be respectively extracted from the FDM file, and imported into the player; and B3, the play-count parameter is stored in a security module of the player and encrypted by an AES key.

The method for controlling digital film play-count, wherein step C specifically includes:

C1, detecting the play-count parameter for a playing film; and

C2, detecting and judging a valid play-count on the basis of different film footages or frame length percentage: it is deemed a valid play if it has played for more than 30 minutes or if has played more than 30% of the total frame even though the played duration is less than 30 minutes; and using the TLS (Transport Layer Security Protocol) to inform the security module for adding 1 to the current play-count in a counter.

The method for controlling digital film play-count, wherein step D also includes:

Upon confirmation of the play-count, a user's operating instructions are permitted to be received throughout the duration of the film play, for example, interrupting and then resuming play or resuming to the same film multiple times.

The method for controlling digital film play-count, wherein step a also includes: the play-count parameter and the KDM file are bundled together and packaged as the FDM file, serving as an extension in conformance with the DCI KDM Standard, wherein the KDM file is the same as an original DCI KDM file.

A system for controlling digital film play-count, wherein it comprises:

A play-count generating module, used for adding a play-count parameter into a KDM file where a key delivery message used for controlling film play is embedded in a process of generating a license file for playing a film, and for generating a film delivery message file known as an FDM file;

An import control module, used for setting key abstracts of the RSA public key in a FDM packager of all authorized contracting film producers in a player, adding a key abstract of the FDM packager of an authorized contracting film producer into the FDM file and importing it into a security module of the player;

A play detection module, used for detecting the play-count parameter of a playing film, detecting and judging a valid play-count on the basis of different film footages or frame length percentage so as to confirm a valid play of the current film, and using a TLS (Transport Layer Security Protocol) encryption message for informing the security module of the valid play of the film;

A play control module, used for judging whether the current play-count is greater than the play-count parameter in the KDM file, the film is permitted to play if no, and prohibited if yes.

The system for controlling digital film play-count, wherein the import control module comprises:

A storage unit, used for pre-storing key abstracts of the RSA public key in an FDM packager of all authorized contracting film producers in a player, and storing the key abstracts in a key abstract list;

An addition unit, used for adding a key abstract of the FDM packager of an authorized contracting film producer into the FDM file, and verifying whether the key abstract in the FDM file is identical to one of the pre-stored key abstracts: if so, the KDM file and the play-count parameter are permitted to be respectively extracted from the FDM file, and imported into the player;

An encrypted storage unit, used for storing the play-count parameter in a security module of the player and the play-count parameter is encrypted by an AES key.

The play detection module comprising:

A detecting unit, used for detecting the play-count parameter for a playing film;

A counting control unit, used for detecting and judging a valid play count on the basis of different film footages or frame length percentage: it is deemed a valid play if it has played for more than 30 minutes or if has played more than 30% of the total frame even though the played duration is less than 30 minutes; and using the TLS (Transport Layer Security Protocol) to inform the security module for adding 1 to the current play-count in a counter.

The system for controlling digital film play-count, wherein the play-count parameter and the KDM file are bundled together and packaged as the FDM file, serving as an extension in conformance with the DCI KDM Standard, wherein the KDM file is the same as an original DCI KDM file.

The present invention provides a method for controlling digital film play-count and a system thereof, wherein a play-count parameter is added into a KDM file where a key delivery message used for controlling film play is embedded, detecting the play-count parameter for a playing film; the film is permitted to play if the current play-count is less than the play-count parameter in the KDM file, and the film is prohibited to play if the current play-count is greater than the play-count parameter in the KDM file. By using the player provided in the present invention which is capable of charging on play-count, digital films to be played in second-tier markets can be controlled. The distribution of digital films during and after theatrical releases can be precisely controlled to meet the demands of the second tier digital film market, namely using the authorized play-count and allowing charging based on the actual play-count.

DETAILED DESCRIPTION

Figure 1:
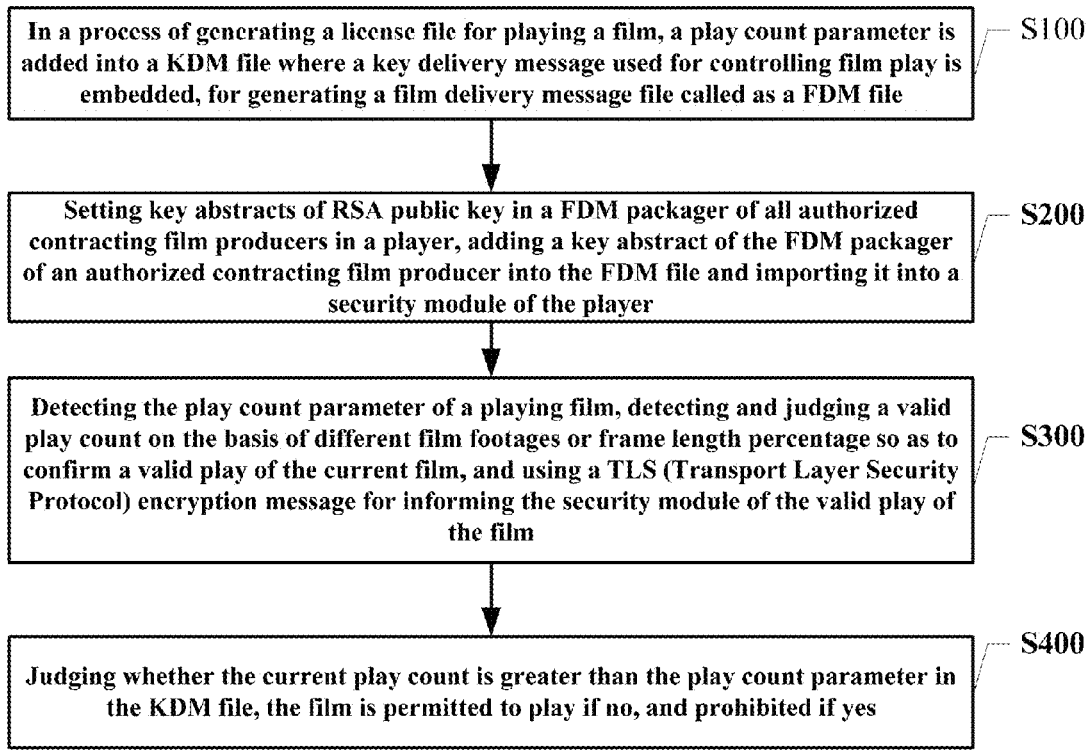
FIG. 1 is a flow chart of a preferred embodiment of a method for controlling digital film play-count provided by an embodiment of the present invention.

The present invention provides methods for controlling digital film play-count and a system thereof. To improve the clarity and understanding of the objective of this invention, further detailed descriptions of the present invention is made by using the drawings and examples. Embodiments described here are used for explanation of the present invention, but not limited to them.

The present invention can provide a method for controlling digital film play-count, wherein it can include the following steps:

Step S100, in a process of generating a license file for playing a film, a play-count parameter can be added into a KDM file where a key delivery message used for controlling film play can be embedded, for generating a film delivery message file known as an FDM file;

In this embodiment, the license file for controlling the film playing can be produced in advance; in the process of generating the license file, a play-count parameter can be authorized; the play-count parameter can be added into the KDM file where the key delivery message used for controlling film play can be embedded, for generating the film delivery message file known as the FDM file. The KDM file, as an original DCI KDM file, can be kept intact without any alterations, thus maintaining its compatibility with the DCI standard. In this embodiment, the play-count parameter and the KDM file can be bundled together for transmitting and packaged as an FDM file, thereby serving as an extension in conformance to the DCI KDM Standard; its extension TAG can be <NonCriticalExtension>.

In the present invention, in order to explicitly extend the KDM TAG and package the play-count content, a FDM (Film Delivery Message) file format can be put forward, for extending and generating the following file on the basis of the KDM; the newly added TAG can be saved under, for example, NonCriticalExtensions, with the embedded KDM completely packaged in its original form.

In the Step S100, in the process of packaging and generating the FDM file, an extended special KDM file (namely FDM format) for packaging KDM and play-count can be used; wherein, the Step S100 can specifically include:

In the process of generating a license file for playing a film, a TAG for extending an original KDM can be used for packaging an original KDM file where a key delivery message used for controlling film play can be embedded together with a parameter of an authorized play-count, to generate a film delivery message file called an FDM file.

In this embodiment, Step S100 can provide a method of the generation and the transmission of the play-count—the KDM and the play-count can be packaged together by the FDM file. In order to maintain the security classification of the existing DCI KDM (DCI: DigitalCopyrightIdentifier; KDM: Key Delivery Message) unchanged, an RSA digital signature method which can be the same as the KDM can be used in the present invention, which makes the KDM of imported films compatible with the KDM of domestic films and reuses all of the existing film distribution process, using the TAG and embedding with the original KDM and desirable play-count into an outer layer KDM (namely, the FDM file). The FDM file, as an extension of the original KDM, can be a security certificate in conformance with the DCI KDM. In essence, the FDM can be packaged and transmitted together with the play-count under the circumstance of maintaining all characteristics of the original KDM unchanged. The RSA digital signature can be used to guarantee the security of the FDM file during transmission.

Figure 2:
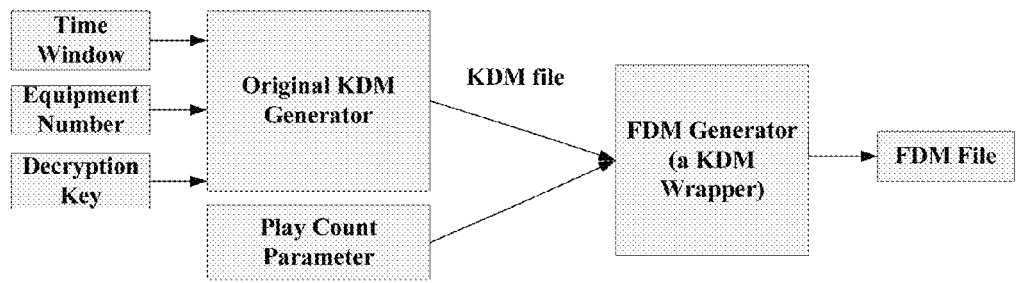
FIG. 2 is a structural diagram for a tamper-prevention method during the process of generating a play-count and a mode of transmission according to an embodiment of the present invention.

As shown in FIG. 2, in this embodiment, a KDM file (namely, the original KDM file) can be generated by an original KDM generator by combining a time window, an equipment number and a decryption key; then, the original KDM file and the play-count parameter can be bundled together by the FDM generator (a KDM wrapper), and embedded into a special KDM TAG, thus generating an FDM file.

The FDM file can be a kind of KDM file using the extended TAG, where the digital signature algorithm and the client machine serial number can be identical to the generated KDM file. It can be compatible with DCI KDM Standard, maintaining the embedded FDM file to be identical to the KDM file in terms of security level, effectively preventing the FDM file from being tampered with during transmission. It can also minimize the risk and expenditure when compared with another method of distributing the KDM and FDM files separately. The RSA algorithm (an encryption algorithm frequently-used for encryption of digital film, not further described here) adopted for digital signature can be consistent with the KDM.

By using the embodiment provided in the present invention which can be capable of charging on play-count, digital films to be played in second-tier markets can be controlled. The distribution of digital films during and after theatrical releases can be precisely controlled to meet the demands of the second tier digital film market, namely using the authorized play-count and allowing charging based on the actual play-count.

Step S200, setting key abstracts of the RSA public key in a FDM packager of all authorized contracting film producers in a player, adding a key abstract of the FDM packager of an authorized contracting film producer into the FDM file and importing it into a security module of the player;

In this step, in order to prevent the FDM file imported into the player from being tampered with, a key abstract list of RSA public key in the FDM packager of all authorized contracting film producers can be pre-stored in the player. This way, only ones matching one of the pre-stored FDMs generated by those authorized contracting film producers can be imported into the player. Step S200 can specifically include:

B1, key abstracts of the RSA public key in a FDM packager of all authorized contracting film producers can be pre-stored in a player, and stored in a key abstract list;

B2, adding a key abstract of the FDM packager of an authorized contracting film producer into the FDM file, and verifying whether the key abstract in the FDM file is identical to one of the pre-stored key abstracts, if so, the KDM file and play-count parameter can be permitted to be respectively extracted from the FDM file, and imported into the player; and B3, the play-count parameter can be stored in a security module of the player and encrypted by an AES key.

Figure 3:
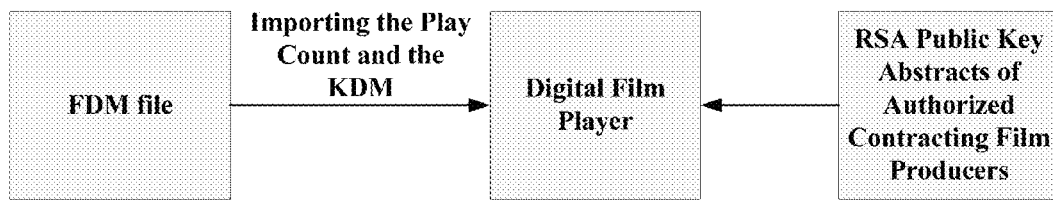
FIG. 3 is a schematic diagram of a process for preventing an import of a tampered play-count according to an embodiment of the present invention.

Specifically, as is shown in FIG. 3, there are 4 key points in importing the FDM file into the player:

1, the import procedure can be divided into 2 steps, both of which can be conducted in the security module (SM), Both the KDM file and the play-count parameter can be separated and then processed respectively. The KDM file can be checked strictly in accordance with the DCI protocol. The play-count can be stored in the security module and encrypted by an AES key. The AES key can be stored in a security chip (for example, DALLAS DS3641 or DS5250 security chip etc.) certified by the DCI. In other words, the file containing the play-count can be stored in the security chip and encrypted by the AES key, and the SHA1 abstract of the storage file can be stored in the security chip certified by the DCI. The security chip can include, but is not limited to, DS3641 or DS5250 etc. In case the file where the play-count stored is tampered with, the security module can perform a detection by comparing SHA1 values previously stored in the security chip, and call for the relevant processing module to take protective measures;

2, the above-mentioned processes can be conducted within the scope of the security module.

3, A film player software that contains the RSA key abstracts of a FDM packager of all authorized contracting film producers, mainly for the purpose of preventing malicious tampering of the FDM. Authority to a contracting film producer can be given by adding and importing an authorized license agreement of the FDM packager, or by storing the authorized key abstract into an executable file, which can only be realized by an updated software;

4, the key abstracts of the FDM packager can be a SHA1 algorithm in conformance with the FIPS Standard.

In a process of importing the FDM into a player, embodiments of the present invention can adopt the key abstracts of the FDM packager of all authorized contracting film producer for preventing import of a tampered-with play-count, and the key abstracts can be encrypted by the AES key and then stored in the security module. In other words, the RSA key abstracts of the FDM packager of all authorized contracting film producers can be pre-stored in the player for preventing import of unauthorized or tampered-with play-count.

Step S300, detecting the play-count parameter for a playing film, detecting and judging a valid play-count on the basis of different film footages or frame length percentage so as to confirm a valid play of the current film, and using a TLS (Transport Layer Security Protocol) encryption message for informing the security module of the valid play of the film;

In this embodiment, to use the play-count parameter securely, the process can apply the logic for valid play verification and play-count accumulation within the security module, meanwhile, the play control module can adopt an algorithm to ensure that the player can query the play-count condition before playing a film, and judge reasonably whether a valid play takes effect on the basis of different film footages at the beginning to play the film, and further update the actual play-count, thus ensuring both the accuracy and validity of the play-count.

Specifically, the method used in the play-count can be as below:

C1, detecting the play-count parameter for a playing film; and

C2, detecting and judging a valid play-count on the basis of different film footages or frame length percentage: it can be deemed as a valid play if, for example, it has played for more than 30 minutes or if it has played more than 30% of the total frame even though its duration of play is less than 30 minutes; and using the TLS (Transport Layer Security Protocol) to inform the security module for adding 1 to the current play-count in a counter.

Figure 4:
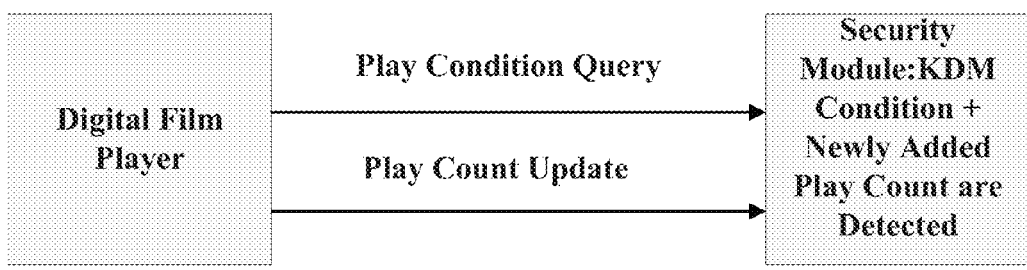
FIG. 4 is a flow chart to illustrate the detection and changing of the play-count on the basis of valid play-count according to an embodiment of the present invention.
Figure 5:
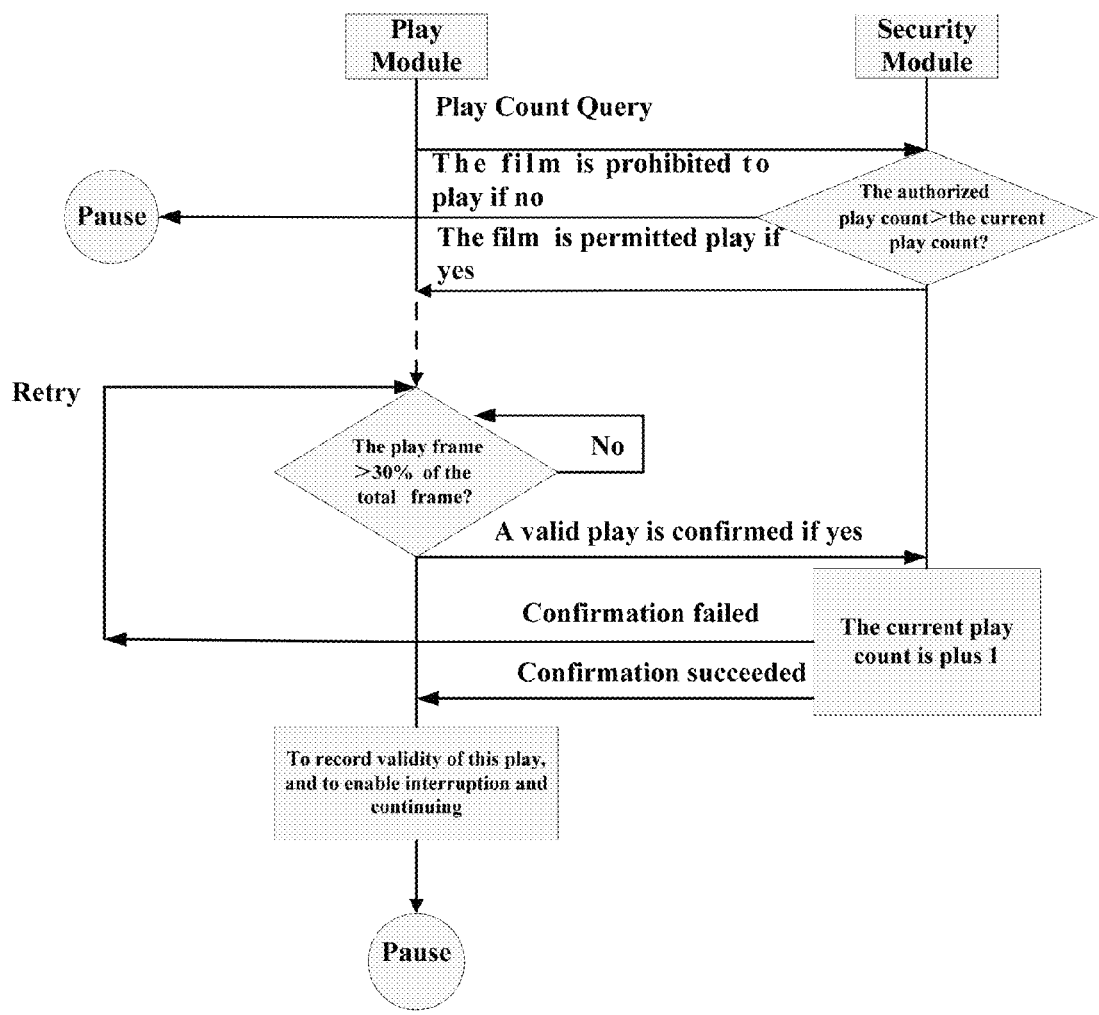
FIG. 5 is a flow chart of a method for calculating a specific play-count according to an embodiment of the present invention.

As shown in FIG. 4, when a digital film player is used for playing a film, both the querying of valid play condition and the aggregation of play-count updates can be conducted in the security module (SM). Building on the original KDM verification process, the security check algorithm can be newly added with the function of checking the authorized play-count and the actual play-count. There are 3 key points: 1. Both the authorized play-count and the actual play-count can be stored in the security module, and the check algorithm can be conducted in the security module; 2. The TLS can be used by the player for carrying out communications with the security module, so as to prevent hackers from hacking; 3. A SHA1 abstract of the storage file in the security module can be stored in the security chip, so as to prevent hackers from tampering.

In other words, in this embodiment of the present invention, a valid play can be checked on the basis of different film footages or frame length percentage, TLS encryption message can be used for informing the security module of a valid play, and logical judgment of play-count can be conducted in the security module.

Step S400, judging whether the current play-count is greater than the play-count parameter in the KDM file, the film can be permitted to play if not, and prohibited if so.

Specifically, upon confirmation of the play count, a user's operating instructions can be permitted to be received throughout the duration of film play, for example, interrupting and then continuing playing or resuming to the same film multiple times.

As shown in FIG. 4, concrete steps for detecting the play-count can include:

Step 1, play-count query: the play module can query the play count stored in the security module;

Step 2, the security module can judge whether the authorized play-count is greater than the current play-count, the film can be prohibited to play if not, and permitted if so; and Step 3, when the film is permitted to play, the current play-count can be incremented by 1. It can be deemed a valid play if it has played for more than 30 minutes or if it has played more than 30% of the total frame even though its film play duration is less than 30 minutes.

In this embodiment of the present invention, there can be 5 key points for the controlling the play algorithm: 1, the conditions for judging whether it constitutes a valid play are self-adaptive; in other words, on the basis of, for example, 30% of the film footage (frame), the TLS (Transport Layer Security Protocol) encryption message can be used for informing the security module to change the current play-count; 2, in case of confirming failure of film play, the play module can repeat the request until it succeeds; 3, once it is confirmed as a successful or valid play, the play module can keep a record to avoid double counting; 4, the operation for judging a valid play can be carried out in a separate thread; 5, users can pause or continue playing the same film multiple times.

In this embodiment of the present invention, after a valid play is confirmed, users can pause or continue playing the same film many times. The method will preclude double counting, and users can continue playing the same film multiple times.

From the above, it can be seen that, in the embodiment of the present invention, both algorithm and data for detecting the play-count can be stored in the security module, and the communication between the security module and the play module can be realized using the TLS security protocol. The algorithm for judging a valid play can be based on films of different footages. As for a longer film (for example, more than 90 minutes), it can be deemed a valid play if it has played for more than 30 minutes; as for a shorter film, a valid play can be judged on the basis of a reasonable percentage (for example 30%) of the length of the film (including time and frame). It should be pointed out that, either alteration of self-adapting parameters or different applications of frame percentage are deemed as within the scope of the claims. The algorithm design can be effectively adaptable to control the play-count of films of different footages.

After a valid play is finished, in the process of subsequent play, users can pause or continue to play the same film for many times. This is because users in private cinemas and the second-tier market require more flexibility in their consumption of digital films. For example, they might pause the playing of a film for receiving a visitor, and perhaps continue to watch the film later on. The claims can contain two technologies as below: 1, the command of "continue or resume playing" can be added in addition to general play control commands, so as to take the previous pause position as a mobile parameter; 2, To continue playing, an algorithm for allowing the security module to skip the play-count check can be added so as to ensure users can watch the entire film.

The play-count can be taken as the basis for payment charges to users. The real-time play-count can be stored in a local database and compared with the play-count in a security log, so as to realize accurate charging. The play-count, as an extension of the security log, can be written down as an existing security log item. Regarding the play log of play-count, the local database can verify its consistency with the security log, serving as the basis for payment charges to users.

Figure 6:
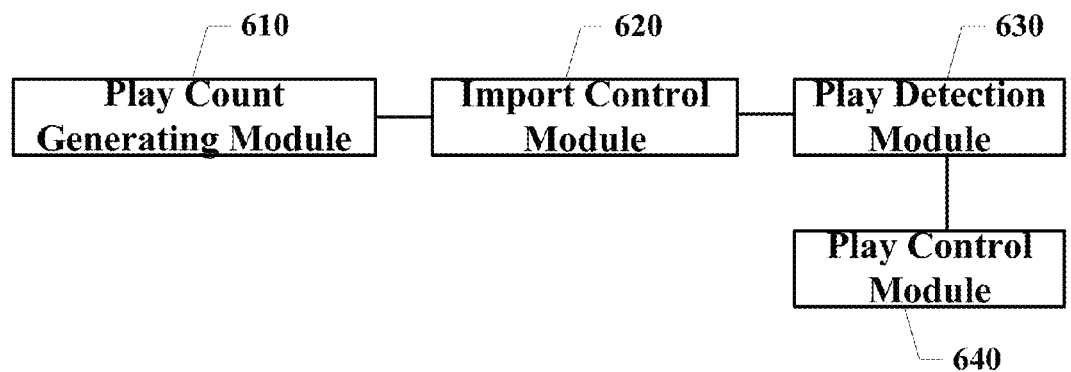
FIG. 6 is a functional block diagram of a system for controlling digital film play-count according to and embodiment of the present invention.

Based on the above-mentioned embodiments, the present invention can also provide a system for controlling digital film play-count, as shown in FIG. 6, the system can include:

A play-count generating module 610, used for adding a play-count parameter into a KDM file where a key delivery message used for controlling film play can be embedded in a process of generating a license file for playing a film, and for generating a film delivery message file called as a FDM file, specifically as described in the above-mentioned Step S100;

An import control module 620, used for setting key abstracts of the RSA public key in a FDM packager of all authorized contracting film producers in a player, adding a key abstract of the FDM packager of an authorized contracting film producer into the FDM file and importing it into a security module of the player, specifically as described in the above-mentioned Step S200;

A play detection module 630, used for detecting the play-count parameter for a playing film, detecting and judging a valid play-count on the basis of different film footages or frame length percentage so as to confirm a valid play of the current film, and using a TLS (Transport Layer Security Protocol) encryption message for informing the security module of the valid play of the film, specifically as described in the above-mentioned Step S300;

A play control module 640, used for judging whether the current play-count is greater than the play-count parameter in the KDM file, the film can be permitted to play if not, and prohibited if so, specifically as described in the above-mentioned Step S400.

The import control module can include:

A storage unit, used for pre-storing key abstracts of the RSA public key in a FDM packager of all authorized contracting film producers in a player, and storing the key abstracts in a key abstract list;

An addition unit, used for adding a key abstract of the FDM packager of an authorized contracting film producer into the FDM file, and verifying whether the key abstract in the FDM file is identical to one of the pre-stored key abstracts: if so, the KDM file and the play-count parameter can be permitted to be respectively extracted from the FDM file, and imported into the player;

An encrypted storage unit, used for storing the play-count parameter in a security module of the player and the play-count parameter can be encrypted by an AES key.

The play detection module can include:

A detecting unit, used for detecting the play-count parameter for a playing film;

A counting control unit, used for detecting and judging a valid play-count on the basis of different film footages or frame length percentage: it can be deemed a valid play if it has played for more than 30 minutes or if it has played more than 30% of the total frame even though it has played for less than 30 minutes; and using the TLS (Transport Layer Security Protocol) to inform the security module for adding 1 to the current play-count in a counter.

The system for controlling digital film play-count, wherein, the play-count parameter and the KDM file can be bundled together and packaged as the FDM file, serving as an extension in conformance with the DCI KDM Standard, wherein the embedded KDM file can be identical to the original DCI KDM file.

The present invention can provide a method for controlling digital film play-count and a system thereof, wherein a play-count parameter can be added into a KDM file where a key delivery message used for controlling film play can be embedded, detecting the play-count parameter for a playing film; the film can be permitted to play if the current play-count is less than the play-count parameter in the KDM file, and the film can be prohibited to play if the current play-count is greater than the play-count parameter in the KDM file, by using the player provided in the present invention which is capable of charging on play-count, digital films to be played in second-tier markets can be controlled. The distribution of digital films during and after theatrical releases can be precisely controlled to meet the demands of the second tier digital film market, namely using the authorized play-count and allowing charging based on the actual play-count.

In some embodiments, one or more of the modules discussed above can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this file, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 7:
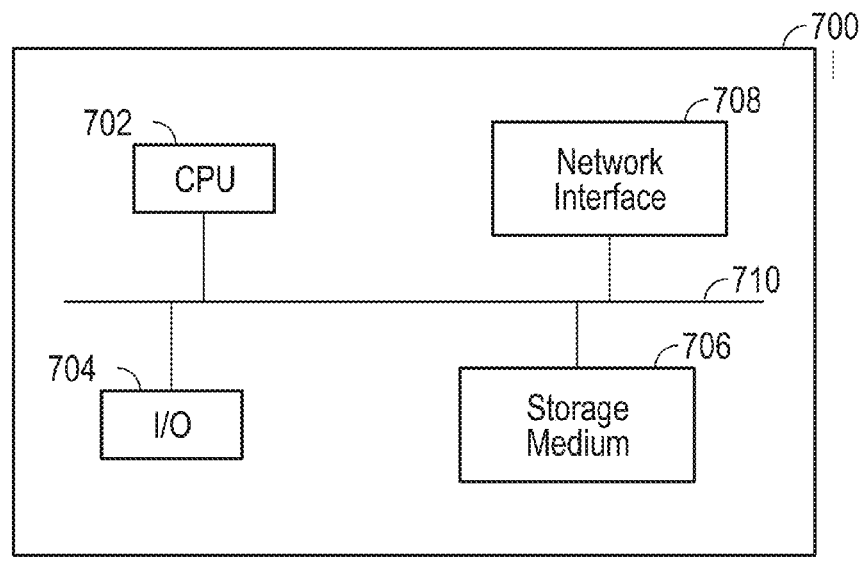
FIG. 7 illustrates exemplary common components of a system such as the one of FIG. 6, according to an embodiment of the present invention.

The non-transitory computer readable storage medium can be part of a computing system such as those discussed in the above-described embodiments of the invention. FIG. 7 illustrates exemplary common components of one such computing system. As illustrated, the system 700 can include a central processing unit (CPU) 702, I/O components 704 including, but not limited to one or more of display, keypad, touch screen, speaker, and microphone, storage medium 706 such as the ones listed in the last paragraph, and network interface 708, all of which can be connected to each other via a system bus 710. The storage medium 706 can include the modules of the embodiments discussed above. One or more of these components can be optional and the system 700 can include other components not illustrated in FIG. 7.

It should be understood that, the application of the present invention is not limited to the above-mentioned embodiments. It will be possible for a person skilled in the art to make modifications or replacements according to the above description, all of those modifications or replacements shall all fall within the scope of the appended claims of the present invention.

What is claimed is:

1. A method for controlling digital film play-count by a player, the method comprising the steps of:

during a process of generating a license file for playing a film, adding a play-count parameter into a Key Delivery Message (KDM) file where a key delivery message used for controlling film play is embedded, for generating a film delivery message file also known as a Film Delivery Message (FDM) file;

verifying whether the key abstract the FDM file is the same or equivalent to one of a pre-stored key abstracts, if yes, the KDM file and play-count parameter are permitted to be extracted from the FDM file and optionally imported into a playback setting a fingerprint of an RSA public key in a FDM packager of authorized contracting film producers in a player, adding a key abstract of the FDM packager of an authorized contracting film producer into the FDM file and importing it into a security module of the player;

detecting the play-count parameter of a playing film and judging a valid play-count on the basis of different film footages or frame length percentage so as to confirm a valid play of the current film, and using a Transport Layer Security Protocol (TLS) encryption message for informing the security module of the valid play of the film; and judging whether the current play-count is less than the play-count parameter in the KDM file, the film is permitted to play if yes, and prohibited if not.

2. A system for controlling digital film play-count by a player, comprising:

a counter configured to add a play-count parameter into a KDM file where a key delivery message used for controlling film play is embedded in a process of generating a license file for playing a film, generate a film delivery message file called an FDM file, and verify whether the key abstract in the FDM file is the same or equivalent to one of a pre-stored key abstracts, if yes, the KDM file and play-count parameter are permitted to be extracted from the FDM file, and optionally imported into a playback;

a controller configured to set a fingerprint of the RSA public key in a FDM packager of authorized contracting film producers in a player, add a key abstract of the FDM packager of an authorized contracting film producer into the FDM file and importing it into a security module of the playback device;

detector configured to detect the play-count parameter for a playing film, and judge a valid play-count on the basis of different film footages or frame length percentage so as to confirm a valid play of the current film, and using a TLS (Transport Layer Security Protocol) encryption message for informing the security module of the valid play of the film;

a play controller configured to determine whether the current play-count is greater than the play-count parameter in the KDM file, permit the film to play if not, and prohibit the film to play if so.

3. A non-transitory computer-readable medium containing set of machine-executable instructions for causing a processor to perform the steps of:

during a process of generating a license file for playing a film, adding a play-count parameter into a Key Delivery Message (KDM) file where a key delivery message used for controlling film play is embedded, for generating a film delivery message file also known as a Film Delivery Message (FDM) file;

verifying whether the key abstract in the FDM file is the same or equivalent to one of a pre-stored key abstracts, if yes, the KDM file and play-count parameter are permitted to be extracted from the FDM file and optionally imported into a playback setting a fingerprint of an RSA public key in a FDM packager of authorized contracting film producer in a player;

adding a key abstract of the FDM packager of an authorized contracting film producer into the FDM file;

importing the FDM file it into a security module of the player;

detecting the play-count parameter of a playing film and judging a valid play-count on the basis of different film footages or frame length percentage so as to confirm a valid play of the current film;

using a TLS (Transport Layer Security Protocol) encryption message to inform the security module of the valid play of the film; and judging whether the current play-count is less than the play-count parameter in the KDM file, the film is permitted to play if yes, and prohibited if not.

\* \* \* \* \*